(12) United States Patent
Dobson et al.

(10) Patent No.: US 11,639,689 B2
(45) Date of Patent: May 2, 2023

(54) INTAKE DEVICE FOR GAS TURBINE ENGINE

(71) Applicant: PRATT & WHITNEY CANADA CORP., Longueuil (CA)

(72) Inventors: Martin Dobson, Brossard (CA); Oleg Iskra, Oakville (CA); Michael Fryer, Oakville (CA); Marc Lavoie, Otterburn Park (CA); Ivan Sidorovich Paradiso, Toronto (CA); Louis Duranleau-Hendrickx, Montreal (CA); Domenico Di Florio, St-Lazare (CA); Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/478,132

(22) Filed: Sep. 17, 2021

(65) Prior Publication Data

US 2023/0093292 A1    Mar. 23, 2023

(51) Int. Cl.
*F02C 9/18*    (2006.01)
*F02C 6/08*    (2006.01)

(52) U.S. Cl.
CPC ............... *F02C 9/18* (2013.01); *F02C 6/08* (2013.01); *F05D 2260/606* (2013.01); *F05D 2270/101* (2013.01); *F05D 2270/65* (2013.01)

(58) Field of Classification Search
CPC ........ F02C 6/08; F02C 9/18; F05D 2270/301; F05D 2270/312; F05D 2270/313; F05D 2270/65; F05D 2260/606; F05D 2270/101; G01F 9/00; G01M 15/14

See application file for complete search history.

(56) References Cited

U.S. PATENT DOCUMENTS

| | | |
|---|---|---|
| 2,047,568 A | 7/1936 | Lissman |
| 4,469,497 A | 9/1984 | Linhardt |
| 4,592,765 A | 6/1986 | Breitman et al. |
| 5,549,721 A | 8/1996 | Shchipachev |
| 5,799,593 A | 9/1998 | Belin et al. |
| 6,152,978 A | 11/2000 | Lundquist |
| 6,250,068 B1 | 6/2001 | Tajima et al. |
| 6,733,554 B2 | 5/2004 | Ribera |

(Continued)

FOREIGN PATENT DOCUMENTS

| | | |
|---|---|---|
| EP | 1750012 | 10/2014 |
| EP | 3346109 A1 | 7/2018 |

(Continued)

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

The gas turbine engine can have a pneumatic actuator; an intake device secured to a gas path wall delimiting the gas path, the intake device having a tubular body protruding from the gas path wall into the gas path and an inlet aperture formed in the tubular body, the inlet aperture spaced-apart from the gas path wall and facing downstream relative a flow orientation of the gas path, the intake device having an internal conduit extending from the inlet aperture, along the tubular body, to an outlet across the gas path wall; and a fluid line fluidly connecting the outlet of the intake device to the pneumatic actuator.

20 Claims, 4 Drawing Sheets

(56) References Cited

U.S. PATENT DOCUMENTS

| | | |
|---|---|---|
| 7,748,952 B1 | 7/2010 | Schopf et al. |
| 8,572,985 B2 | 11/2013 | Waddleton |
| 9,110,475 B2 | 8/2015 | Simpson |
| 10,267,430 B2 | 4/2019 | Simpson |
| 10,286,407 B2 | 5/2019 | Correia et al. |
| 10,512,876 B2 | 12/2019 | Mercier et al. |
| 10,824,172 B1* | 11/2020 | DeFelice ............ G05D 7/0146 |
| 11,008,889 B2 | 5/2021 | Ratzlaff et al. |
| 11,008,979 B2 | 5/2021 | McCaffrey et al. |
| 2002/0066366 A1 | 6/2002 | Conrad et al. |
| 2003/0075048 A1 | 4/2003 | Jordan et al. |
| 2008/0178571 A1 | 7/2008 | So et al. |
| 2009/0139191 A1 | 6/2009 | Roundy et al. |
| 2010/0326090 A1 | 12/2010 | Waddleton |
| 2014/0013767 A1* | 1/2014 | Bohney .................... F02C 6/08 |
| | | 60/785 |
| 2014/0298788 A1 | 10/2014 | Blaney et al. |
| 2015/0096641 A1 | 4/2015 | Chow et al. |
| 2015/0211417 A1 | 7/2015 | Yamaguchi et al. |
| 2018/0340474 A1* | 11/2018 | Baladi ..................... F02C 9/18 |
| 2019/0309683 A1* | 10/2019 | Mackin ................. B64D 15/04 |
| 2020/0025005 A1* | 1/2020 | Dunnigan ................ F01D 9/06 |
| 2020/0284161 A1 | 9/2020 | Lefebvre et al. |
| 2021/0246832 A1* | 8/2021 | Tu ........................... F01D 25/26 |

FOREIGN PATENT DOCUMENTS

| | | |
|---|---|---|
| EP | 3626942 | 10/2021 |
| FR | 3027973 | 5/2016 |
| JP | 2000104547 | 4/2000 |
| RU | 2109971 | 4/1998 |

* cited by examiner

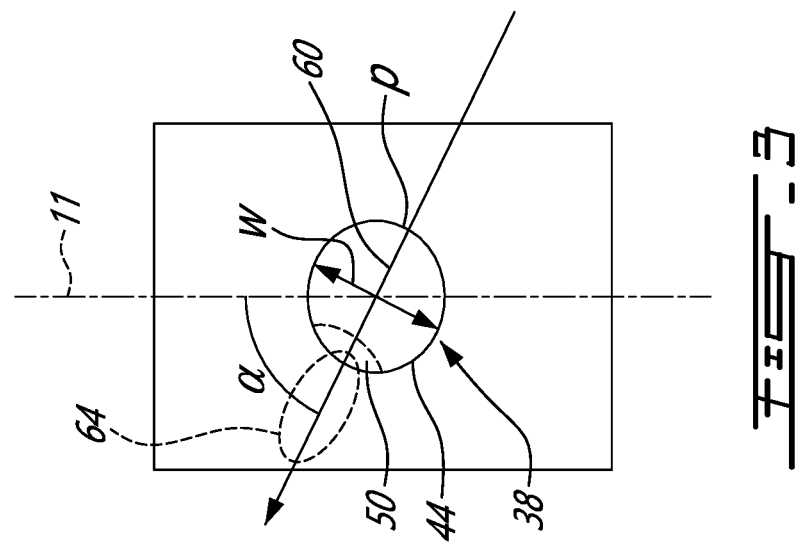
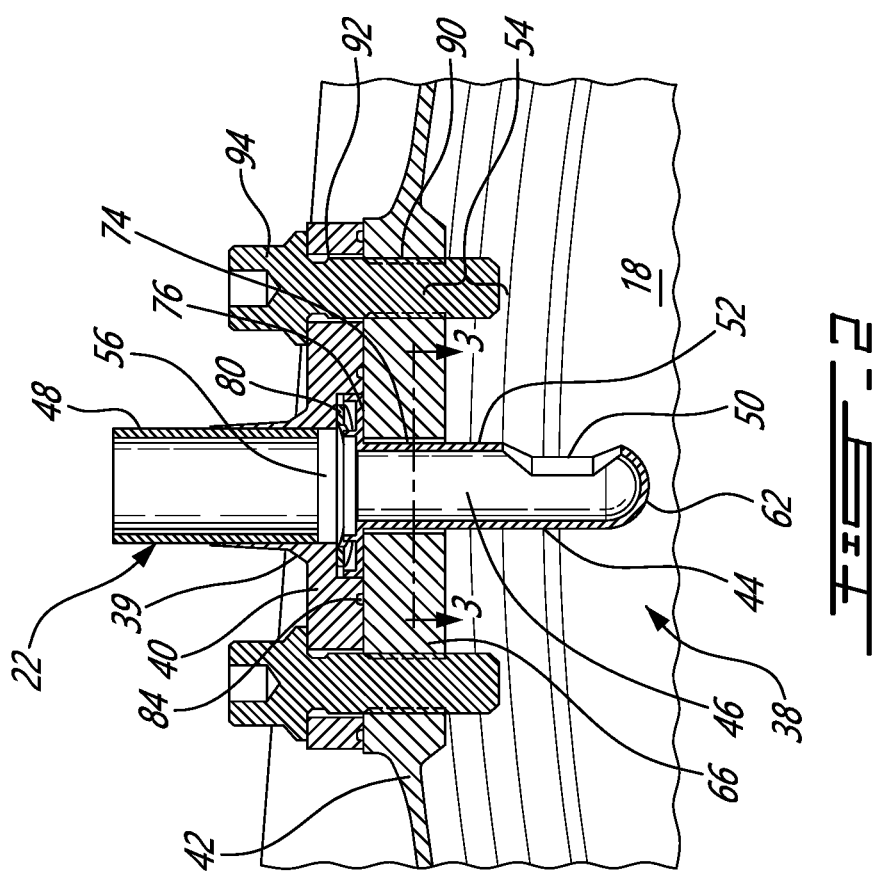

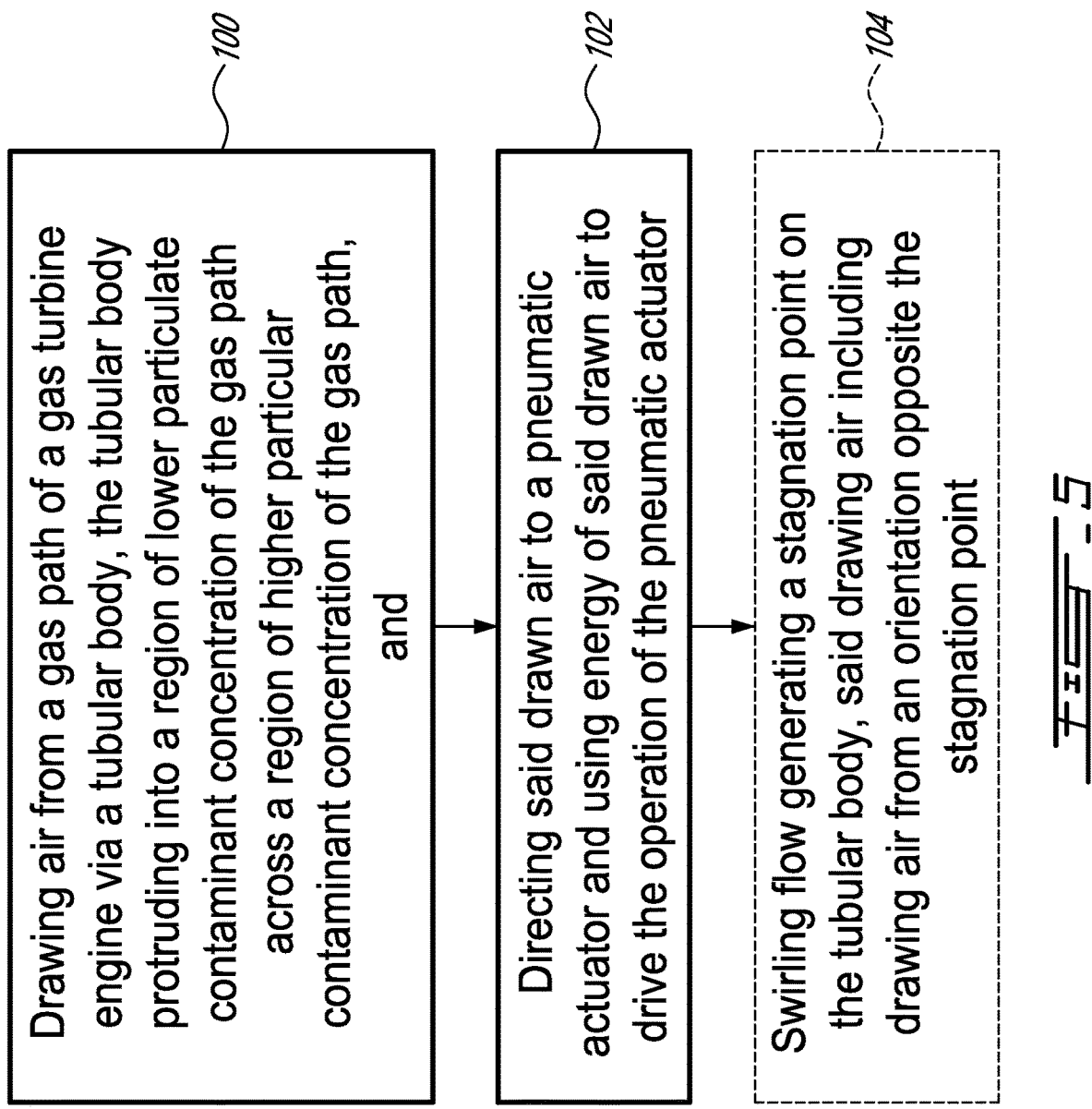

INTAKE DEVICE FOR GAS TURBINE ENGINE

TECHNICAL FIELD

The application relates generally to gas turbine engines and, more particularly, to pneumatic systems therefore.

BACKGROUND OF THE ART

Gas turbine engines can have pneumatic systems which use gaseous pressure conveyed by a fluid line. Some pneumatic systems, such as pneumatic actuators in particular, may be sensitive to the presence of contaminants such as particles in the gaseous pressure source. Such fluid lines can have an evacuation passage which can be useful to drain condensation and/or for use as a vent, for instance. If the source of pressurized gas is known to potentially contain particulate contaminants, the vent can be configured in a manner to evacuate some of the particulate contaminants, but some can nonetheless remain in the portion of the line extending between the vent and the pneumatic actuator. A filter can be used in the fluid line to protect the pneumatic system. The use of a filter, however, can represent a tradeoff in terms of weight, initial costs, and maintenance costs for instance. It can be desired to reduce the weight and size of the filter, but doing so typically affects the filter capacity and may entrain more frequent maintenance, which may be undesired due to factors such as maintenance costs and down time. Accordingly, although former pneumatic system fluid lines have been satisfactory to a certain degree, there always remains room for improvement.

SUMMARY

In one aspect, there is provided a gas turbine engine comprising: a gas path extending in serial flow communication across a compressor section, a combustor section, and a turbine section, the gas path extending annularly around an engine axis; a pneumatic actuator; an intake device secured to a gas path wall delimiting the gas path, the intake device having a tubular body protruding from the gas path wall into the gas path and an inlet aperture formed in the tubular body, the inlet aperture spaced-apart from the gas path wall and facing downstream relative a flow orientation of the gas path, the intake device having an internal conduit extending from the inlet aperture, along the tubular body, to an outlet across the gas path wall; and a fluid line fluidly connecting the outlet of the intake device to the pneumatic actuator.

In another aspect, there is provided an intake device for a gaseous fluid line of a gas turbine engine, the intake device comprising: a base securable to a gas path wall of the gas turbine engine, the gas path wall delimiting a gas path; a tubular body having a length extending from the base to a closed tip, the closed tip in the gas path when the base is secured, the tubular body having an inlet aperture oriented transversally to the length, the tubular body having an unapertured portion extending along the length between the base and the inlet aperture, the tubular body defining an internal conduit portion extending along the length between the inlet aperture and an outlet formed through the base, the outlet connectable to the gaseous fluid line when the base is secured.

In a further aspect, there is provided a method of operating a pneumatic actuator of a gas turbine engine including: drawing air from a gas path of the gas turbine engine via a tubular body, the tubular body protruding into a region of lower particulate contaminant concentration of the gas path across a region of higher particular contaminant concentration of the gas path, and directing said drawn air to the pneumatic actuator and using energy of said drawn air to drive the operation of the pneumatic actuator.

DESCRIPTION OF THE DRAWINGS

Reference is now made to the accompanying figures in which:

FIG. 2 is a cross-sectional view of a intake device secured to a gas path wall of the gas turbine engine;

FIG. 3 is a schematic cross-sectional view taken along lines 3-3 of FIG. 2, showing the relative orientation between the intake device and the flow orientation;

FIG. 5 is a flow chart of an example method of operating a pneumatic actuator.

DETAILED DESCRIPTION

Figure 1:
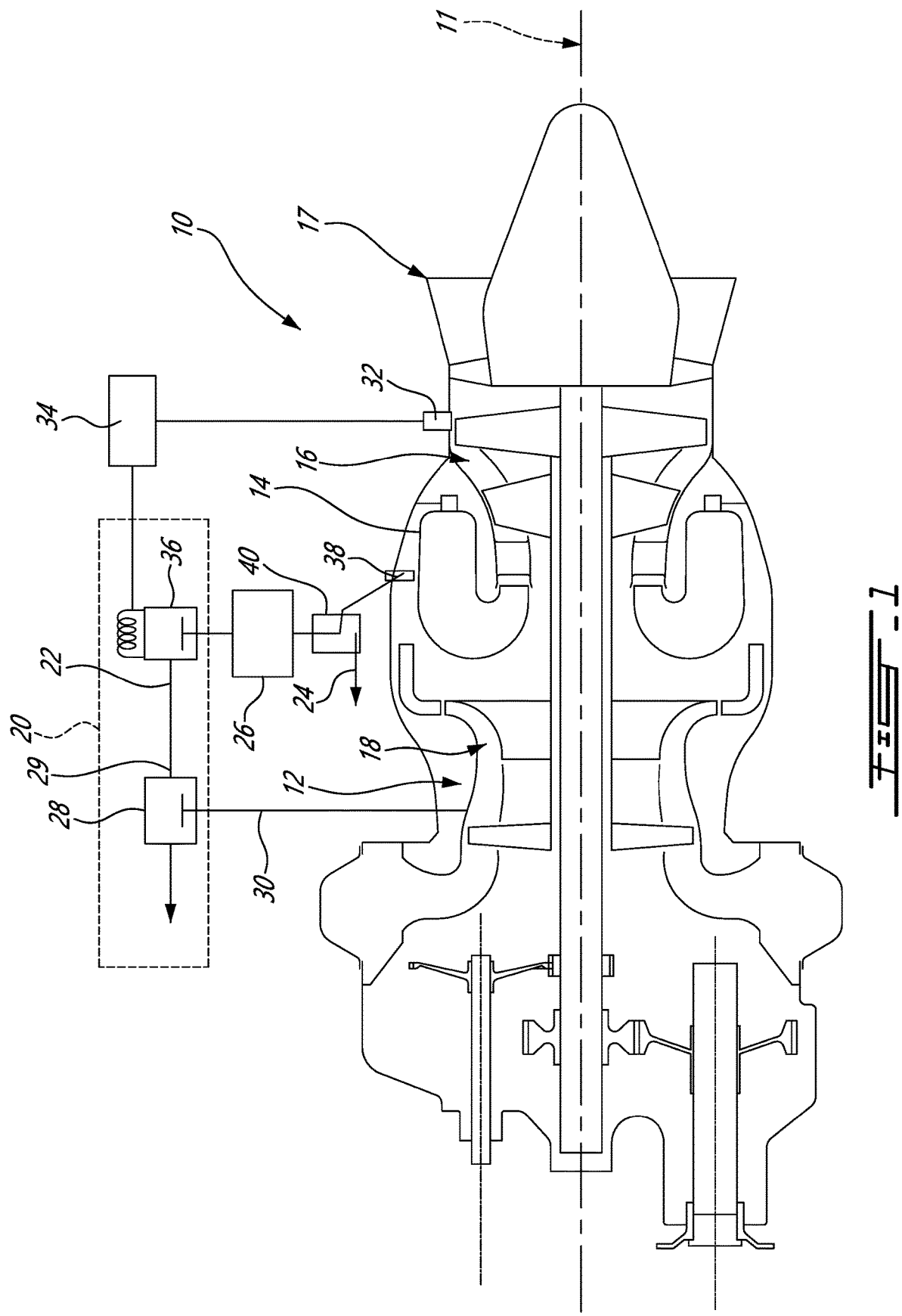
FIG. 1 is a schematic cross-sectional view of a gas turbine engine.

FIG. 1 illustrates an example of a gas turbine engine. In this example, the turbine engine 10 is a turboshaft engine generally comprising in serial flow communication, a multistage compressor section 12 for pressurizing the air, a combustor section 14 in which the compressed air is mixed with fuel and ignited for generating an annular stream of hot combustion gases around the engine axis 11, and a turbine section 16 for extracting energy from the combustion gases. The turbine engine terminates in an exhaust section 17.

The fluid path extending sequentially across the compressor section 12, the combustor section 14 and the turbine section 16 can be referred to as the main gas path 18. The pressure and temperature of the working fluid typically varies significantly along the main gas path 18. The pressure can be significantly higher immediately downstream of the compressor section 12 than immediately upstream of the compressor section 12, for instance, and can be even higher between the combustor section 14 and the turbine section 16, at which point the working fluid can also be particularly hot. In the embodiment shown in FIG. 1, the turboshaft engine 10 has two compressor and turbine stages, including a high pressure stage associated to a high pressure shaft, and a low pressure stage associated to a low pressure shaft, leading to intermediate pressures between compressor stages or between turbine stages. The low pressure shaft can be used as a power source during use.

Gas turbine engines 10 can be equipped with one or more pneumatic system 20. Pneumatic systems can serve various purposes, and can involve one or more pneumatic actuator which is driven by gas (typically air) pressure, or another pneumatic device which may be sensitive to particulate contaminants. It can be convenient to use a pneumatic system 20 on a gas turbine engine 10 given the availability of pressurized gas at various pressures from the main gas path 18. The gas pressure can be conveyed between the desired pressurized gas source, which can be a point along the main gas path 18 for instance, to the pneumatic actuator via a fluid line 22.

Such fluid lines 22 can have an evacuation passage 24 which can be useful to drain condensation and/or for use as a vent, for instance. If the source of pressurized gas is likely to contain contaminants such as particles, which may be the case when bleeding air pressure from the main gas path 18, or a bypass path, of a gas turbine engine 10, the vent if present can be configured in a manner to evacuate most of the particulate contaminants, though some may remain in the portion of the fluid line leading to the actuator. In one example, an orifice pack 40 can include a diffuser upstream and longitudinally aligned with a vent, and a downstream line can extend transversally outwardly from the diffuser portion to the actuator. A filter 26 can also be used in the fluid line 22 to protect the pneumatic actuator, or other sensitive pneumatic device, from the contaminants. Filters 26 have predetermined contaminant accumulating capacities and need to be changed when they are about to reach that capacity, which can entrain undesired effects such as down time and maintenance costs. Accordingly, on the one hand, one may wish to increase the filter capacity in order to reduce down time and maintenance costs. However, increasing the filter capacity can lead to increasing weight, volume and/or costs of the filter, which may be undesired. Still other contaminant separating devices than vents and filters may be used in some embodiments. There are different types of pneumatic systems 20 which can serve different and various purposes and the configuration of the fluid line, including the choice of component integrated thereto, can be adapted based on the varying needs associated with different potential embodiments.

In the example embodiment presented in FIG. 1, the gas turbine engine has an example pneumatic system 20 having a bleed-off valve 28 (BOV) which is pneumatically activated via a pneumatic actuator. More specifically, the bleed-off valve 28 is used to control air flow along a pressure relief line 30, to selectively release or not release air pressure from the main gas path 18, upstream of the combustion chamber 14, to the atmosphere, based on operating conditions of the gas turbine engine 10. A pneumatic actuator of a bleed-off valve 28 is one example of a pneumatic device which may benefit from being shielded from particulate contaminants.

In the embodiment presented in FIG. 1, it can be suitable for the bleed-off valve 28 to be supplied with pressurized gas at a relatively high pressure. This need can be satisfied, in this example, by sourcing the pressurized gas from a point along the main gas path 18 commonly referred to as P3 air, downstream of the highest pressure compressor stage, in the vicinity of the combustion chamber 14, from an area which can be referred to herein as the combustor region for simplicity. The high pressure air in this region may contain contaminants such as particles in some operating conditions. To protect the pneumatic actuator of the bleed-off valve 28, it can be desired to use one or more contaminant separating device at some point along the fluid line 22.

One type of contaminant separating device which can be used to limit the amount of particulate contaminant which could otherwise reach a sensitive pneumatic device such as a pneumatic actuator is an intake device 38 which can be used at the intake of a pneumatic system fluid line.

FIG. 2 presents an example embodiment of an example intake device 38. The intake device 38 generally has a base 40 secured to the gas path wall 42, and a tubular body 44 protruding from the base 40 into the gas path 18. The intake device 38 has an inlet aperture 50. The intake device 38 can form an intake segment of a fluid line 22 and can thus have a internal conduit portion 38 establishing fluid communication between the inlet aperture 50 and a downstream segment 48 of the fluid line 22, via an internal conduit portion 46 formed along a length of the tubular body 44 and an outlet 56 formed through the base 40.

The inlet aperture 50 can be spaced apart from the gaspath wall 42 by an unapertured portion 52 of the tubular body 44. The unapertured portion 52 of the tubular body 44 can be said to extend along a spacing distance 54 between the inlet aperture 50 and the gaspath wall 42. Indeed, it was found that when particulate contaminants are present in the gas path 18, there can be a greater concentration of particulate contaminants in the immediate vicinity of the gaspath wall 42 than deeper into the gas path. The length of the unapertured portion 52 of the tubular body 44 can be of at least 0.2 times the length of the tubular body, for instance. Accordingly, the spacing distance 54 can correspond to a region of higher concentration of particulate contaminants and the portion of the gas path extending away from the gas path wall 42 farther than the spacing distance 54 can correspond to a region of lower concentration of particulate contaminants. Using an intake device 38 which has a tubular body 44 which protrudes into the gas path 18, away from the gas path wall 42, in a manner for the inlet aperture 50 to be spaced apart from the gas path wall 42, can work somewhat as a snorkel and allow to draw gas from a region of lower particulate contaminant density, across a region 54 of higher particulate contaminant density, and can ultimately reduce the amount of particulate matter which makes its way into the fluid line right from the ingress, which in turn can be expected to reduce the amount of particulate contaminant which makes its way to the pneumatic actuator. In some embodiments, the resulting reduction in particulate contaminants from the sole measure of the snorkel effect can be satisfactory in and of itself. In other embodiments, a filter may be deemed relevant, and the snorkel effect may help reducing the filter specifications and thus allow a smaller or less expensive filter, or simply to reduce filter maintenance requirements. In some embodiments, it can be preferred to use an additional contaminant separating device along the fluid line 22, in addition to the intake device 38.

In the example embodiment presented in FIG. 2, additional particulate contaminant separation features to the spacing distance 54 are included, which may result in an even greater particulate matter efficiency in some embodiments.

In particular, as best seen in FIG. 3, in one embodiment, the inlet aperture 50 is oriented and directed generally in the same orientation and direction as the flow orientation 60 of the gas flow in the gas path, in the vicinity of the intake device 38. Accordingly, the inlet aperture 50 can be shielded by the tubular body 44 from direct impingement of particulate matter. More specifically, the flow orientation 60 can be associated with a stagnation point p, which can be a point where the flow velocity is zero and where the flow is divided around both laterally opposite sides of the tubular body 44. In other words, the location of the inlet aperture 50 can be selected in a manner to be diametrically opposite to the stagnation point p.

Determining the orientation 60 of the gas flow, and thus the stagnation point, may bear some challenges, and require simulating the gas flow in one or more operating conditions of interest using computational fluid dynamics (CFD) analysis software tools. Indeed, while someone unskilled in the art may tend to imagine that the flow along the gas path 18 is mostly in the axial and the radial orientation relative to the engine axis 11, in reality, rotating components such as the compressor section can impart a significant circumferential component to the flow, typically referred to as "swirl", which can remain in the flow downstream thereof, such as in the combustor region in particular. This effect is schematized in the view of FIG. 3 where a flow orientation 60 determined by simulation can be seen to form a significant angle α relative the engine axis 11, leading to a point of impingement p which is also, and oppositely, angularly offset from the main axis 11 by angle α. The inlet aperture 50 can be designed in a manner to be diametrically opposite to this point of impingement p, relative an orientation of the length of the tubular body 44 (the length of the tubular body being visible in FIG. 2).

Indeed, in the example embodiment presented in FIG. 1, the intake device 38 is positioned at the intake point of the fluid line 22, which is located here in the P3 air region or compressor region, and the intake device 38 is thus secured to a gas path wall 42 forming part of the of the combustor section 14. This is a region which can in particular experience strong swirl flow characteristics. In alternate embodiments, the intake point can be at another position and the intake device can thus be positioned at such other position along a pressurized gas path such as a main gas path or a bypass path.

From the point of view of identifying a gas flow orientation based upon which the orientation of the inlet aperture 50 will be determined, the simulated averaged out gas flow orientation in most typical operating scenarios can be retained in some embodiments, even though it will be understood that in some less usual operating conditions, the actual orientation and speed of the gas flow may significantly depart from the simulated averaged out gas flow orientation. Indeed, choosing an orientation and direction of the inlet aperture 50 which has roughly the same orientation and direction as the gas flow orientation 60 in most operating conditions can be highly suitable and allow to significantly reduce the overall amount of particulate debris which enters the fluid line, thus achieving an objective in an embodiment. In other embodiments, it may be known that particulate contaminant density is significantly higher in a particular operating condition, such as takeoff for instance, and the orientation and direction of the inlet aperture 50 can be based on the simulated gas flow orientation which can be expected at that specific operating condition.

In this specific embodiment, the tip 62 of the tubular body 44 is closed and unapertured, and can further be rounded (e.g. hemispherical) to offer a smoother aerodynamic profile, and the inlet aperture 50 is defined transversally relative the length of the tubular body 44, through what can be referred to as a peripheral wall of the tubular body 44.

Moreover, it will be understood that in the context presented above, it can be more efficient from a particulate matter separation standpoint to use an inlet aperture 50 which is narrower, to a certain extent, than the width W of the tubular body 44. The width W can be taken transversally to the length of the tubular body 44, and in the orientation transversal to the gas flow orientation 60. Indeed, gas being a compressible fluid having a limited viscosity, depending on flow velocity, the gas flow may tend to wrap around the tubular body 44 to a certain extent, before detaching and forming a lower pressure zone 64 behind the obstacle, formed here by the tubular body 44. Such flow characteristics may be simulated and the configuration of the inlet aperture 50 can be selected accordingly. In some embodiments, such simulations can lead to the conclusion that selecting an inlet aperture 50 which is to a certain extent narrower than the tubular body 44 can offer greater particulate matter separation efficiency even though it may also limit the surface area of the inlet aperture 50. To avoid forming a flow restriction at the inlet aperture 50, it can be preferred to use an inlet aperture 50 which has a surface area at least as large as the cross-sectional internal surface area of the outlet 56. In embodiments where it is not desired to increase the width W of the tubular body 44 while also being desired to use an inlet aperture 50 which is narrower than the width W of the tubular body 44, it is possible to achieve a larger inlet aperture surface area by using an inlet aperture which is elongated in the orientation of the length of the tubular body. In some embodiments, it can be preferred to use a inlet aperture width which has less than 90% of the width W of the tubular body, for instance.

Figure 4B:
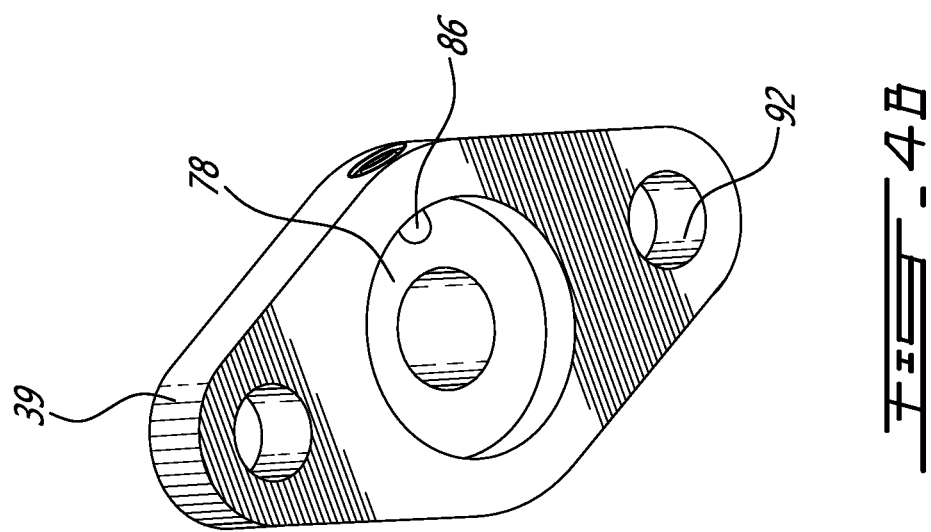
FIGS. 4A and 4B are oblique views of corresponding portions of the intake device in accordance with an embodiment.
Figure 4A:
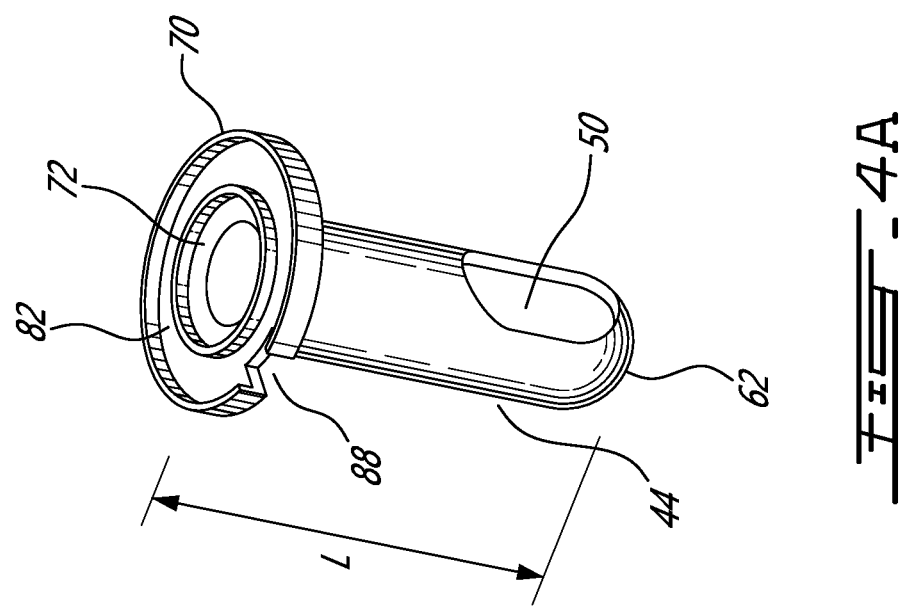

In the specific embodiment illustrated, the tubular member 44 has a generally cylindrical shape, and thus has a circular cross-section (see FIG. 3). The inlet aperture 50 can have an obround shape, with two lengthwisely opposite semi-circular ends spaced apart from one another along the orientation of the length of the tubular body 44, as best seen in FIG. 4A, which is a shape which may adapt well to a cylindrical tubular body 44. Moreover, the tip 62 of the tubular body 44, which extends in the gas path 18, can be hemispherical in this context. It will be understood that in alternate embodiments, the shape of the tubular member 44 can vary such as for structural or aerodynamic reasons. Similarly, the shape of the inlet aperture 50 and the shape of the tip 62 can vary as well. It can be advantageous to position the inlet aperture 50 as close as possible (adjacent) to the tip 62 in order to avoid any more weight than necessary.

Referring back to FIG. 1, in this specific embodiment illustrated, the base 40 is configured in a manner to be fastenable to a suitably configured boss 66 formed in the gas path wall. More specifically, the boss 66 can have fastener apertures 90, and the base 40 can have an adapter 39 having flanges with fastener apertures 92. Fasteners 94 can be used to secure the adapter 39 to the boss 66 via the fastener apertures 90, 92. In alternate embodiments, other techniques for securing the base 40 to the gas path wall may be retained. For instance, it may be preferred to solder or braze the base 40 to the gas path wall 42.

In this embodiment, the adapter is provided at an end of the downstream segment 48 of the fluid line 22, and is made integral to the downstream segment 48 of the fluid line. This is an example design feature which is optional and the base 40 can separately be secured or connected to the downstream segment 48 of the fluid line 22 in alternate embodiments.

In some embodiments, it can be preferred to form the tubular body 44 and the adapter 39 as a single component, such as by machining, additive manufacturing or molding. In this embodiment, however, it was preferred to manufacture the tubular body 44 as an initially separate component, as perhaps best seen in FIGS. 4A and 4B.

Indeed, in this embodiment, the tubular body 44 has a peripheral flange 70 extending transversally, relative the length L, from an end 72 of the tubular body 44 which is opposite the tip 62. A fluid line aperture 74 is formed in the boss. During assembly, the tubular body 44 is introduced, via the tip 62, across the fluid line aperture 74, until the peripheral flange 70 comes into abutment with the surrounding, receiving face 76 of the boss 66 (see FIG. 2). The peripheral flange 70 can become axially trapped between the adapter 39 and the boss 66 once installation is complete.

The adapter 39 can be provided with a socket 78 which is shaped and sized in a manner to tightly receive the peripheral flange 70. To allow for suitable manufacturing tolerances, while offering an impervious seal between the peripheral flange 70 and the receiving face 76 of the boss 66, a resilient member 80, such as a wave spring for instance, can be introduced between the peripheral flange 70 and the socket 78, to bias the peripheral flange 70 firmly against the receiving face 76 of the boss 66 independently of potential thickness variations between the socket 78 and the peripheral flange 70. As shown in FIG. 4A, the proximal face of the peripheral flange 70 can be provided with an annular groove 82 to accommodate a wave spring. The thickness of the peripheral flange 70, the thickness of the socket 78, and the thickness of the wave spring can be selected in a manner for the gap between the proximal face of the peripheral flange 70, adjacent the groove 82, and the corresponding face of the socket 78 to be less than the thickness of the wave spring. In this latter manner, should the wave spring fail or break during operation, it will remain trapped within the groove 82 until disassembly, when maintenance can be performed.

The adapter 39 can be provided with one or more crush gaskets 84 which become sealingly engaged between the adapter 39 and the boss 66 when the adapter 39 is fastened into operating position. If providing the tubular body 44 as a separate component from an adapter 39, and since the orientation of the inlet aperture 50 relative the gas flow orientation 60 may be relevant, one may wish to provide an alignment feature between the peripheral flange 70 and the socket 78. In the embodiment presented in FIGS. 4A and 4B, the alignment feature includes an alignment pin 86 provided as part of the socket 78, and an alignment slot 88 provided as part of the peripheral flange 70. When engaging the peripheral flange 70 in the socket 78, forced circumferential alignment between the pin 86 and the slot 88 allows to ensure that the designed inlet aperture orientation will be respected when the assembly is complete. In alternate embodiments, other forms of alignment features can be used, such as by using a D-shaped socket and a correspondingly D-shaped peripheral flange for instance. Moreover, in the illustrated embodiment, the socket has a male alignment feature and the peripheral flange has a female alignment feature, but it will be understood that in an alternate embodiment, the socket can have a female alignment feature and the peripheral flange can have a male alignment feature.

Referring back to the specific example presented in FIG. 1, it will be understood that the bleed-off valve 28 can be a piloted valve. One or more pressure or temperature sensor 32 is used which is connected to a controller 34. Based, potentially amongst other factors, on the sensed temperature and/or pressure, the controller 34 can determine whether the operating conditions satisfy criteria for releasing air pressure or not. If the controller 34 determines that the criteria are met, the controller 34 operates a pilot valve 36, which can be a solenoid valve for instance, and switches the pilot valve 36 to an open condition. The pilot valve 36 can default to the closed condition in the absence of positive control by the controller, for instance. Once in the open condition, pressurized gas is allowed across the pilot valve 36. The pressurized gas then builds pressure in the fluid line 22, between the pilot valve 36 and the pneumatic actuator 29 of the bleed-off valve 28, and toggles or otherwise activates the actuator 29 of the bleed-off valve 28 to open the bleed-off valve 28, which can also be closed by default. When the bleed-off valve 28 is in the open position, the pressure release line 30 extending between the point along the main gas path 18 where pressure is to be released and the atmosphere can be open, allowing the pressure release. In alternate embodiments, the bleed-off valve can be controlled directly by a difference in pressure between the pressurized gas line 22 and the pressure release line, with or without a biasing force, to name one possible alternate example in which it may also be desired to protect the pneumatic actuator from contaminants.

Still referring to the example embodiment presented in FIG. 1, it will be understood that in some embodiments, it can be convenient or otherwise useful to provide an evacuation passage 24 to act as a drain and/or a vent as a segment along the length of the fluid line. Such an evacuation passage 24 can be used to evacuate any condensation which may occur in the fluid line, for example, and may also be used as a vent which constantly allows a minor flow of pressurized air circulation for regulation and good function of the fluid line 22. The evacuation passage 24 can be integrated to a fitting conventionally connected to other segments of the fluid line 22, such as an orifice pack 40 for instance, and thus form part of the fluid line 22, for instance.

In accordance with one example method of operation, with reference to FIG. 5, it will be understood that a pneumatic actuator of a gas turbine engine can be operated including drawing 100 air from a gas path of the gas turbine engine via a tubular body, the tubular body protruding into a region of lower particulate contaminant concentration of the gas path across a region of higher particular contaminant concentration of the gas path, and directing 102 said drawn air to the pneumatic actuator and using energy of said drawn air to drive the operation of the pneumatic actuator. In some embodiments, drawing air is performed while a swirling flow is sustained 104 in the gas path, the swirling flow generating a stagnation point on the tubular body, said drawing air including drawing air from an orientation opposite the stagnation point.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine comprising:
   a gas path extending in serial flow communication across a compressor section, a combustor section, and a turbine section, the gas path extending annularly around an engine axis;
   a pneumatic actuator;
   an intake device secured to a gas path wall delimiting the gas path, the intake device having a tubular body protruding from the gas path wall into the gas path and an inlet aperture formed in the tubular body, the inlet aperture spaced-apart from the gas path wall and facing downstream relative a flow orientation of the gas path, the tubular body closed in an orientation facing upstream relative the flow orientation, opposite the inlet aperture, the intake device having an internal conduit extending from the inlet aperture, along the tubular body, to an outlet across the gas path wall; and
   a fluid line fluidly connecting the outlet of the intake device to the pneumatic actuator.

2. The gas turbine engine of claim 1 wherein the intake device is located in the combustor section of the gas path.

3. The gas turbine engine of claim 1 wherein the pneumatic actuator is an actuator of a bleed valve, the bleed valve controlling fluid passage between the compressor section and the atmosphere.

4. The gas turbine engine of claim 1 wherein the flow orientation of the gas path in the vicinity of the intake device has a circumferential swirl component around the engine axis, the orientation of the inlet aperture relative the internal conduit being oblique relative the engine axis.

5. The gas turbine engine of claim 1 wherein the gas path wall has a boss with fastener apertures, the base has an adapter having flanges with fastener apertures, further comprising fasteners securing the flanges to the boss via the fastener apertures.

6. The gas turbine engine of claim 5 wherein the adapter has a segment of the fluid line extending opposite the tubular body.

7. The gas turbine engine of claim 5 wherein a peripheral flange extends transversally from an end of the tubular body opposite the closed tip, said peripheral flange axially trapped between the adapter and the boss.

8. The gas turbine engine of claim 7 further comprising a resilient member between the adapter and the peripheral flange, the resilient member biasing the peripheral flange against a receiving face of the boss.

9. The gas turbine engine of claim 7 wherein the peripheral flange has a first one of a male and female alignment feature and the adapter has a mating, second one of a male and female alignment feature, the male and female alignment feature being engaged with one another and locking the orientation of the inlet aperture relative the flow orientation.

10. The gas turbine engine of claim 5 further comprising a crush gasket between the adapter and the boss.

11. An intake device for a gaseous fluid line of a gas turbine engine, the intake device comprising:
    a base securable to a gas path wall of the gas turbine engine, the gas path wall delimiting a gas path; and
    a tubular body having a length extending from the base to a closed tip, the closed tip in the gas path when the base is secured, the tubular body having an inlet aperture oriented transversally to the length, the tubular body having an unapertured portion extending along the length between the base and the inlet aperture, the tubular body having a portion being closed and unapertured transversally opposite the inlet aperture the tubular body defining an internal conduit portion extending along the length between the inlet aperture and an outlet formed through the base, the outlet connectable to the gaseous fluid line when the base is secured.

12. The intake device of claim 11 wherein the tubular body has a width transversal to the length, the inlet aperture being narrower than the width of the tubular body, the inlet aperture being elongated in the orientation of the length.

13. The intake device of claim 12 wherein a width of the inlet aperture in an orientation transversal to the length of the tubular body has less than 90% of the width of the tubular body.

14. The intake device of claim 12 wherein the inlet aperture is obround and has two lengthwisely opposite semi-circular ends.

15. The intake device of claim 11 wherein the tubular body is cylindrical and the closed tip is hemispherical.

16. The intake device of claim 11 wherein the base includes an adapter having transversally opposite flanges, each flange being apertured to receive a corresponding fastener for securing the base to the gas path wall.

17. The intake device of claim 11 wherein a length of the unapertured portion is of at least 0.2 times the length of the tubular body.

18. A method of operating a pneumatic actuator of a gas turbine engine comprising:
    drawing air from a gas path of the gas turbine engine via a tubular body, the tubular body protruding into a region of lower particulate contaminant concentration of the gas path across a region of higher particular contaminant concentration of the gas path, the drawing of air being shielded from direct impingement of particulate contaminant by the tubular body; and
    directing said drawn air to the pneumatic actuator and using energy of said drawn air to drive the operation of the pneumatic actuator.

19. The method of claim 18 wherein said drawing air is performed while a swirling flow is sustained in the gas path, said swirling flow generating a stagnation point on the tubular body, the stagnation point being a point where velocity of the swirling flow is zero and where the swirling flow is divided around laterally opposite sides of the tubular body, said drawing air including drawing air from an orientation opposite the stagnation point.

20. The method of claim 18, wherein said directing of said drawn air to the pneumatic actuator and using energy of said drawn air to drive the operation of the pneumatic actuator includes said drawn air toggling the pneumatic actuator to open a bleed-off valve of the gas turbine engine.

* * * * *